United States Patent
Hirase et al.

(10) Patent No.: US 9,000,116 B2
(45) Date of Patent: Apr. 7, 2015

(54) BLOW MOLDING ETHYLENE RESIN COMPOSITION AND BLOW MOLDED ARTICLE THEREFROM

(75) Inventors: Yoshiyuki Hirase, Chiba (JP); Kenji Iwamasa, Ichihara (JP)

(73) Assignees: Prime Polymer Co., Ltd., Tokyo (JP); Mitsui Chemicals, Inc., Tokyo (JP)

( * ) Notice: Subject to any disclaimer, the term of this patent is extended or adjusted under 35 U.S.C. 154(b) by 394 days.

(21) Appl. No.: 13/437,821

(22) Filed: Apr. 2, 2012

(65) Prior Publication Data

US 2012/0189792 A1 Jul. 26, 2012

Related U.S. Application Data

(62) Division of application No. 12/448,173, filed as application No. PCT/JP2008/050373 on Jan. 15, 2008, now abandoned.

(30) Foreign Application Priority Data

Jan. 16, 2007 (JP) ................................. 2007-007312

(51) Int. Cl.
*C08F 110/02* (2006.01)
*B29D 22/00* (2006.01)
*B29C 49/00* (2006.01)
*C08L 23/04* (2006.01)
*B29C 49/04* (2006.01)
*B29C 49/22* (2006.01)
*B29K 23/00* (2006.01)
*B29L 31/00* (2006.01)

(52) U.S. Cl.
CPC ............. *B29C 49/0005* (2013.01); *C08L 23/04* (2013.01); *B29C 49/04* (2013.01); *B29C 49/22* (2013.01); *B29K 2023/06* (2013.01); *B29K 2023/086* (2013.01); *B29K 2995/0083* (2013.01); *B29K 2995/0089* (2013.01); *B29L 2031/7172* (2013.01); *C08L 2205/02* (2013.01); *C08L 2314/00* (2013.01)

(58) Field of Classification Search
CPC .... B29C 49/0005; B29C 49/04; B29C 49/22; C08L 23/04; C08L 2314/00; C08L 2205/02; C08L 2666/02; B29K 2023/06; B29K 2023/086; B29K 2995/0083; B29K 2995/0089; B29L 2031/7172
USPC .......................................... 526/352; 428/35.7
See application file for complete search history.

(56) References Cited

U.S. PATENT DOCUMENTS

| | | |
|---|---|---|
| 4,990,640 A | 2/1991 | Tsutsui et al. |
| 5,321,106 A | 6/1994 | LaPointe |
| 5,547,722 A | 8/1996 | Uehara et al. |
| 5,614,457 A | 3/1997 | Ewen et al. |
| 5,663,249 A | 9/1997 | Ewen et al. |
| 5,895,797 A | 4/1999 | Hayashihara et al. |
| 6,121,395 A | 9/2000 | Turner |
| 6,417,120 B1 | 7/2002 | Mitchler et al. |
| 6,713,561 B1 | 3/2004 | Berthold et al. |
| 2006/0047079 A1 | 3/2006 | Takahashi et al. |
| 2006/0054513 A1 | 3/2006 | Lequeux et al. |
| 2006/0189775 A1* | 8/2006 | Takahashi et al. ............ 526/352 |
| 2006/0241256 A1 | 10/2006 | Baann et al. |
| 2007/0244286 A1* | 10/2007 | Okamoto et al. ............. 526/348 |

FOREIGN PATENT DOCUMENTS

| | | |
|---|---|---|
| CN | 1717447 A | 1/2006 |
| EP | 1 849 805 A1 | 10/2007 |
| JP | 01-501950 A | 7/1989 |
| JP | 01-502036 A | 7/1989 |
| JP | 02-78687 A | 3/1990 |
| JP | 03-179005 A | 8/1991 |
| JP | 03-179006 A | 8/1991 |
| JP | 03-207703 A | 9/1991 |
| JP | 03-207704 A | 9/1991 |
| JP | 06-172594 A | 6/1994 |
| JP | 07-090021 A | 4/1995 |
| JP | 07-101433 A | 4/1995 |
| JP | 10-001579 A | 1/1998 |
| JP | 10-195260 A | 7/1998 |
| JP | 2002-310385 A | 10/2002 |
| JP | 2003-510429 A | 3/2003 |
| JP | 2004-300297 | 10/2004 |
| JP | 2005-523968 A | 8/2005 |
| JP | 2006-193671 A | 7/2006 |
| JP | 2006-233207 A | 9/2006 |
| JP | 2007-177021 A | 7/2007 |
| JP | 2008-031382 A | 2/2008 |
| WO | WO 00/78828 A1 | 12/2000 |
| WO | WO 2004/083265 A1 | 9/2004 |
| WO | WO 2006/019147 A1 * | 2/2006 |

OTHER PUBLICATIONS

International Search Report dated Apr. 1, 2008 for International Application No. PCT/JP2008/050373, 2 pages.
Notification of First Office Action in CN Appln No. 200880001349 dated Jan. 20, 2011.
Office Action Japanese Patent Application No. 2008-554040 dated May 14, 2013.

* cited by examiner

*Primary Examiner* — William Cheung
(74) *Attorney, Agent, or Firm* — Foley & Lardner LLP

(57) ABSTRACT

A blow molding ethylene resin composition satisfies the following requirements [a], [b], [c] and [d] at the same time:

[a] the melt flow rate (MFR) at a temperature of 190° C. under a load of 21.6 kg is in the range of 1.0 to 15 g/10 min;

[b] the density is in the range of 955 to 970 kg/m$^3$;

[c] the number of methyl branches per 1000 carbon atoms is less than 0.1 according to $^{13}$C-NMR;

[d] the tensile impact strength measured at −40° C. in accordance with JIS K 7160 is not less than 270 kJ/m$^2$.

12 Claims, No Drawings

BLOW MOLDING ETHYLENE RESIN COMPOSITION AND BLOW MOLDED ARTICLE THEREFROM

CROSS-REFERENCE TO RELATED APPLICATIONS

This application is a divisional of U.S. patent application Ser. No. 12/448,173, filed Jun. 11, 2009, which is the National Phase of International Application No PCT/JP2008/050373, filed Jan. 15, 2008, now abandoned, and published as WO 2008/087945 which, in turn, claims priority to Japanese Application No. 2007007312, filed Jan. 16, 2007. The contents of all of these applications are incorporated herein by reference.

FIELD OF THE INVENTION

The present invention relates to blow molding polyethylene resin compositions and blow molded articles comprising the compositions. Suitable blow molded articles

BACKGROUND OF THE INVENTION

Blow molded containers such as fuel containers including gasoline tanks are manufactured by blow molding. Blow molding is a process in which a resin is molten in an extruder and extruded into a tubular parison; the parison is clamped between molds and a pressurized gas is blown into the parison through a blow pin to swell and shape the parison to match the cavity in the mold; and the resin is cooled. The blow molding process is easy and can be applied to a variety of molded articles ranging from complex shapes such as gasoline tanks and drum cans to panel-shaped articles. This process is therefore used widely in the industry.

Fuel tanks for internal combustion engines such as automobile engines have been typically made of metals. In recent years, however, there has emerged a trend to use plastic fuel tanks because of the need for automotive lightening aimed at energy saving as well as rust-freeness and easy molding to the desired shape. However, no techniques have been established with regard to plastic fuel tanks capable of sufficient and balanced characteristics even in reduced thickness, and processes for producing such tanks with good productivity. Accordingly, novel techniques are constantly desired in the plastic fuel tank industry.

In general, plastic fuel tanks typically have a large volume of approximately 60 liters. To meet this volume requirement while corresponding to the need of thickness reduction that is expected to grow progressively in the future, very high material properties will be required for plastic fuel tanks. In detail, the fuel tanks will be required to have good environmental stress crack resistance, creep resistance and impact resistance.

Patent Document 1 discloses polyethylene compositions suited for the blow molding of gasoline tanks. The composition is a blend of a high molecular weight polymer and a low molecular weight polymer and is produced with a Ziegler catalyst. However, it is conceivable that the compositions cannot meet the aforesaid property requirements. In the working examples of Patent Documents 2 and 3, fuel tanks are disclosed which are produced from titanium catalyst-catalyzed ethylene polymers and show excellent impact resistance even in small thickness. Patent Documents 4 and 5 disclose multimodal polyethylene molding materials produced with a titanium catalyst and improved in ESCR-rigidity balance and swelling ratio, and also disclose blow molded articles such as fuel tanks produced from the blow molding materials.

Patent Document 1: JP-A-H06-172594
Patent Document 2: JP-A-H07-090021
Patent Document 3: JP-A-H07-101433
Patent Document 4: JP-A-2003-510429
Patent Document 5: JP-A-2006-193671
Patent Document 6: JP-A-2005-523968
Patent Document 7: WO 2004/083265
Patent Document 8: WO 2006/019147

SUMMARY OF THE INVENTION

These materials have excellent impact strength but may not show sufficient resistance to heat distortion under long-term stress such as high temperature tensile creep.

Patent Document 6 discloses multimodal polyethylenes that are prepared with a titanium catalyst or a metallocene catalyst and have a tensile creep strain at 80° C. of not more than 2.4% and a Charpy impact strength at −40° C. of not less than 15 kJ/m$^2$. The working examples of this patent document, however, do not disclose or suggest polyethylenes having a density of 955 to 970 kg/m$^3$ and excellent tensile impact strength. One of the applicants of the present invention has filed patent applications directed to ethylene polymers with excellent flowability, moldability and other properties such as mechanical strength (Patent Documents 7 and 8). The present applicants have further studied diligently ethylene polymers and resin compositions that are suitably used for fuel tanks, thus completing the present invention.

As described hereinabove, the polyolefin resin materials are required to have improved long-term properties such as impact resistance and creep resistance from the conventional levels in order to reduce the thickness of molded articles such as blow molded articles and fuel tanks. However, it has not been feasible to improve both molding properties such as thin moldability and long-term mechanical properties in a balanced manner.

It is therefore an object of the present invention to provide polyolefin resin materials that have improved and well-balanced molding properties such as thin moldability and long-term mechanical properties.

The present inventors have diligently studied and have found that the foregoing problems are solved by ethylene polymer resin compositions satisfying specific requirements. The present invention has been completed based on the finding.

A blow molding ethylene resin composition according to the present invention comprises a single or two or more ethylene polymers and satisfies the requirements [a], [b], [c] and [d] described below at the same time. In the specification, the "blow molding ethylene resin compositions" may be composed of ethylene polymers alone or may be blends of ethylene polymers and not more than 1 wt %, based on the composition, of known additives described later. When the compositions are composed of ethylene polymers alone, they may be formed of a single ethylene polymer or two or more ethylene polymers. The parameters ([a] to [g]) defined in the claims of the present invention with regard to the blow molding ethylene resin compositions are values measured on granulated pellets of a blend as will be described in the working examples later. In detail, 100 parts by weight of an ethylene polymer was blended with 0.10 part by weight of a secondary antioxidant and 0.10 part by weight of a heat stabilizer, and the blend was granulated into pellets and tested.

[a] The melt flow rate (MFR) at a temperature of 190° C. under a load of 21.6 kg is in the range of 1.0 to 15 g/10 min.

[b] The density is in the range of 955 to 970 kg/m³.

[c] The number of methyl branches per 1000 carbon atoms is less than 0.1 according to $^{13}$C-NMR.

[d] The tensile impact strength measured at −40° C. in accordance with JIS K 7160 is not less than 270 kJ/m².

The blow molding ethylene resin composition of the present invention preferably satisfies the requirement [e] in addition to the requirements [a] to [d].

[e] The flexural modulus measured in accordance with JIS K 7171 is in the range of 1,100 to 1,700 MPa.

The blow molding ethylene resin composition of the present invention preferably satisfies the requirement [f] in addition to the requirements [a] to [e].

[f] In a full-notch tensile fatigue test (FNFT, testing temperature: 80° C., testing speed: 0.5 Hz) in accordance with JIS K 6774, the actual stress is in the range of 5 to 12 MPa when the number of cycles to fracture is 10,000 and the actual stress is in the range of 4 to 8 MPa when the number of cycles to fracture is 100,000.

In a particularly preferred embodiment, the blow molding ethylene resin composition satisfies the requirement [g] in addition to the requirements [a] to [f].

[g] In a tensile creep test (testing temperature: 80° C.) in accordance with JIS K 7115, the creep strain at a test stress of 6 MPa after 100 hours is not more than 10%.

According to another aspect of the present invention, blow molded articles comprise the above blow molding ethylene resin compositions, and fuel tanks have the blow molded articles.

In detail, a blow molded article according to the present invention includes a layer comprising the blow molding ethylene resin composition.

A fuel tank according to the present invention is a blow molded article comprising a laminate structure having a polyethylene layer (I) comprising the blow molding ethylene resin composition, a barrier layer (II), a recycled layer (III) and an adhesive layer (IV).

In the fuel tank, it is preferred that the polyethylene layer (I) and the barrier layer (II) are laminated together through the adhesive layer (IV). It is also preferable that the recycled layer (III) and the barrier layer (II) are laminated together through an adhesive layer.

In the fuel tank, it is preferred that the barrier layer (II) comprises an ethylene/vinyl alcohol copolymer.

Advantages of the Invention

The blow molded articles comprising the resin compositions of the invention, and fuel tanks that are a preferred application of the blow molded articles show excellent long-term properties such as impact resistance and creep resistance while ensuring rigidity required for molded articles even when they are produced in reduced thickness.

BEST MODES FOR CARRYING OUT THE INVENTION

The blow molding ethylene resin compositions according to the present invention are mainly, 99 wt % or more, composed of ethylene polymers. The ethylene polymers contain not more than 2.0 mol % of structural units derived from a C6-10 α-olefin.

The C6-10 α-olefins (hereinafter, also referred to as the "α-olefins") include 1-hexene, 4-methyl-1-pentene, 3-methyl-1-pentene, 1-octene and 1-decene. Of the α-olefins, at least one selected from 1-hexene, 4-methyl-1-pentene and 1-octene is preferably used. α-Olefins having 5 or less carbon atoms are more likely to be incorporated in the crystal (Polymer, Vol. 31, p. 1999, 1990) and the strength tends to be lowered as a result. If α-olefins having more than 10 carbon atoms are used, the flow activation energy is increased and the viscosity tends to change greatly during molding. Further, the use of α-olefins having more than 10 carbon atoms can result in crystallization of side chains (branches formed by the α-olefins copolymerized with ethylene) and consequently amorphous parts tend to be weak.

The content of the structural units derived from the α-olefins is generally not more than 2.0 mol %, preferably in the range of 0.02 to 1.5 mol %, and more preferably 0.02 to 1.30 mol % based on all the structural units.

When the ethylene polymer is produced continuously in two or more stages as will be described later, ethylene may be homopolymerized in the first stage and ethylene and the α-olefin may be copolymerized in the second stage. In this case, the words "all the structural units" refer to all the structural units of the final polymer obtained from the continuous polymerization in two or more stages.

The blow molding ethylene resin compositions of the present invention may be monomodal or multimodal, but are preferably multimodal because the parameters defined in the invention may be controlled more easily.

The blow molding ethylene resin compositions satisfy the following requirements [a] to [d] at the same time.

[a] The melt flow rate (MFR) at a temperature of 190° C. under a load of 21.6 kg is in the range of 1.0 to 15 g/10 min, preferably 2.0 to 10 g/10 min, and more preferably 4.0 to 9.0 g/10 min.

If MFR is less than 1.0 g/10 min, a heavy load is caused to the extruder when the composition is extruded into a parison and a sufficient output cannot be ensured. If MFR exceeds 15 g/10 min, the shape of a molten parison may be unstable because of insufficient melt viscosity or melt tension.

[b] The density is in the range of 955 to 970 kg/m³, preferably 955 to 965 kg/m³, and more preferably 955 to 960 kg/m³.

If the density is less than 955 kg/m³, the rigidity of the obtainable blow molded articles may be insufficient or the use as fuel tanks will be encountered with the lowering in rigidity by swelling. If the density exceeds 965 kg/m³, the blow molded articles will be brittle and will not show impact resistance.

[c] The number of methyl branches per 1000 carbon atoms is less than 0.1, and preferably less than 0.08 according to $^{13}$C-NMR. Polymers satisfying this requirement have a solid crystal structure and achieve superior mechanical strength. Ethylene polymers that are produced with catalyst systems as will be described later have a number of methyl branches below the detection limit (0.08 per 1000 carbon atoms), so that methyl branches are not detected.

[d] The tensile impact strength measured at −40° C. in accordance with JIS K 7160 is not less than 270 kJ/m², preferably from 290 kJ/m², and more preferably from 300 to 500 kJ/m².

This tensile impact strength ensures that the obtainable blow molded articles withstand impacts or drop impacts caused by, for example, vibration or vehicle accidents.

The blow molding ethylene resin compositions preferably satisfy the requirement [e] in addition to the requirements [a] to [d].

[e] The flexural modulus measured in accordance with JIS K 7171 is in the range of 1,100 to 1,700 MPa, preferably 1,100 to 1,600 MPa, more preferably 1,100 to 1,400 MPa, and particularly preferably 1,100 to 1,300 MPa.

This flexural modulus ensures that the obtainable blow molded articles show excellent rigidity particularly at room temperature. In detail, the molded articles are hard and strong, and therefore the thickness thereof may be reduced compared to conventional molded articles.

The blow molding ethylene resin compositions preferably satisfy the requirement [f] or [g], and more preferably both the requirements [f] and [g] in addition to the requirements [a] to [e].

[f] In a full-notch tensile fatigue test (FNFT, testing temperature: 80° C., testing speed: 0.5 Hz) in accordance with JIS K 6774, the actual stress is in the range of 5 to 12 MPa, preferably 7 to 12 MPa, and more preferably 8 to 12 MPa when the number of cycles to fracture is 10,000 and the actual stress is in the range of 4 to 8 MPa, preferably to 8 MPa, and more preferably 6 to 8 MPa when the number of cycles to fracture is 100,000.

When the tensile fatigue strength measured on notched samples at 80° C. is in the above range, the blow molding ethylene resin compositions show a brittle fracture mode and have excellent long-life properties.

[g] In a tensile creep test (testing temperature: 80° C.) in accordance with JIS K 7115, the creep strain at a test stress of 6 MPa after 100 hours is not more than 10%, preferably not more than 9.5%, and more preferably not more than 9.0%.

The blow molding ethylene resin compositions having this creep strain show excellent creep resistance particularly at high temperatures. In detail, the resin compositions surpass conventional materials in heat distortion resistance at high temperatures that are likely to be reached during actual use, and the thickness of the molded articles may be reduced.

In addition to the requirements [a] to [f], the blow molding ethylene resin compositions preferably have an intrinsic viscosity [η] of 2.5 to 6.0 (dl/g), and more preferably 3.0 to 5.0 (dl/g). The blow molding ethylene resin compositions having this intrinsic viscosity show superior rigidity and low-temperature impact resistance.

The ethylene polymers that are main components constituting 99 wt % or more of the blow molding ethylene resin compositions may be suitably prepared by homopolymerizing ethylene or copolymerizing ethylene and the C6-10 α-olefin described above using a metallocene olefin polymerization catalyst such as:

an olefin polymerization catalyst containing:

(A) a transition metal compound in which a cyclopentadienyl group and a fluorenyl group are linked together with a covalent bonding bridge containing a Group 14 atom of the periodic table (hereinafter, also referred to as the "bridged metallocene compound");

(B) at least one compound (hereinafter, also referred to as the "cocatalyst") selected from:

(B-1) organometallic compounds;

(B-2) organoaluminum oxy-compounds; and (B-3) compounds capable of reacting with the transition metal compound to form an ion pair; and optionally (C) a carrier.

The components (A), (B) and (C) will be described hereinbelow.

(A) Transition Metal Compounds

The transition metal compounds (A) are represented by Formula [I] or [II] below:

[Chem. 1]

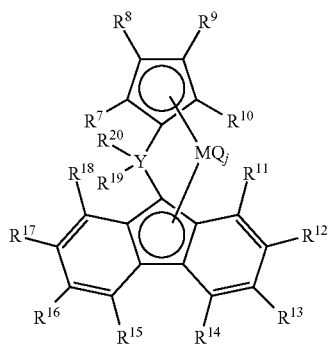

[Chem. 2]

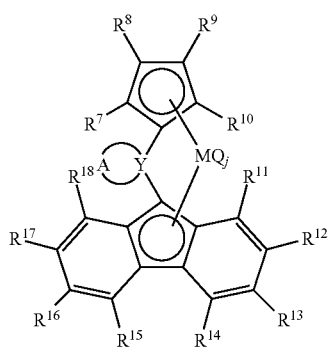

In Formulae [I] and [II], $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ are each a hydrogen atom, a hydrocarbon group, a halogen-containing hydrocarbon group or a silicon-containing hydrocarbon group and are the same or different from one another; adjacent groups of $R^7$ to $R^{18}$ may be linked together to form a ring; A is a C2-20 divalent hydrocarbon group that may contain an unsaturated bond and/or an aromatic ring and forms a ring structure together with Y; A may contain two or more ring structures inclusive of the ring it forms with Y; Y is a carbon atom or a silicon atom; M is a Group 4 metal atom of the periodic table; Q at each occurrence is a halogen atom, a hydrocarbon group, an anionic ligand or a neutral ligand capable of coordination by lone pair electrons and Q may be the same or different from one another; and j is an integer of 1 to 4.

Preferred transition metal compounds (A) correspond to Formula [I] or [II] in which $R^7$ to $R^{10}$ are all hydrogen atoms, Y is a carbon atom, M is a zirconium atom, and j is 2.

Of the transition metal compounds (A) of Formula [I], the compounds in which $R^{12}$, $R^{13}$, $R^{16}$ and $R^{17}$ are all hydrocarbon groups are preferably used.

In the transition metal compounds (A) represented by Formula [I], the bridging atom Y in the covalent bonding bridge preferably has the same or different aryl groups (i.e., $R^{19}$ and $R^{20}$ are aryl groups that may be the same or different from each other). Examples of the aryl groups include phenyl, naphthyl and anthracenyl groups, and substituted groups of these aryl groups wherein at least one aromatic hydrogen (sp2 hydrogen) is substituted with a substituent group. Examples of the substituent groups include hydrocarbon groups of 1 to 20 total carbon atoms (f1), silicon-containing groups of 1 to 20 total carbon atoms (f2) and halogen atoms. Examples of the hydrocarbon groups of 1 to 20 total carbon atoms (f1)) include alkyl groups, alkenyl groups, alkynyl groups and aryl groups consisting solely of carbon and hydrogen; heteroatom-containing hydrocarbon groups wherein part of the hydrogen atoms directly bonded to the carbon atoms in the above hydrocarbon groups are substituted by halogen atoms, oxygen-containing groups, nitrogen-containing groups or silicon-containing groups; and hydrocarbon groups wherein any two adjacent hydrogen atoms in the above hydrocarbon groups are substituted by an alicyclic structure. Specific examples of the hydrocarbon groups (f1) include linear hydrocarbon groups such as methyl, ethyl, n-propyl, allyl, n-butyl, n-pentyl, n-hexyl, n-heptyl, n-octyl, n-nonyl and n-decanyl groups; branched hydrocarbon groups such as isopropyl, tert-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl and 1-methyl-1-isopropyl-2-methylpropyl groups; cyclic saturated hydrocarbon groups such as cyclopentyl, cyclohexyl, cycloheptyl, cyclooctyl, norbornyl and adamantyl groups; cyclic unsaturated hydrocarbon groups such as phenyl, naphthyl, biphenyl, phenanthryl and anthracenyl groups and nuclear alkyl-substituted products thereof; saturated hydrocarbon groups substituted with an aryl group such as benzyl or cumyl group; and heteroatom-containing hydrocarbon groups such as methoxy, ethoxy, phenoxy, N-methylamino, trifluoromethyl, tribromomethyl, pentafluoroethyl and pentafluorophenyl groups.

The silicon-containing groups (f2) include groups that are directly bonded to the ring carbon atom of the cyclopentadienyl group via a direct covalent bonding through a silicon atom, with examples including alkylsilyl groups and arylsilyl groups. Specific examples of the silicon-containing groups of 1 to 20 total carbon atoms (f2) include trimethylsilyl and triphenylsilyl groups.

Specific examples of the aryl groups in Formula [I] that are the same or different from each other and are bonded to the bridging atom Y in the covalent bonding bridge include phenyl, tolyl, tert-butylphenyl, dimethylphenyl, biphenyl, cyclohexylphenyl, (trifluoromethyl)phenyl, bis(trifluoromethyl)phenyl, chlorophenyl and dichlorophenyl groups.

The transition metal compounds (A) used in the working examples described later are represented by Formula [III] below, but the transition metal compounds usable in the invention are not limited thereto.

[Chem. 3]

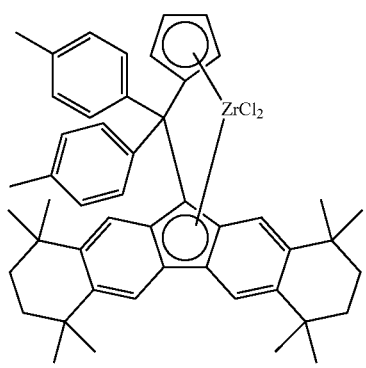

[III]

The transition metal compounds of Formula [III] were identified by 270 MHz $^1$H-NMR (GSH-270 manufactured by JEOL Ltd.) and FD-mass spectrometry (SX-102A manufactured by JEOL Ltd.).

(B) Cocatalysts

[(B-1) Organometallic Compounds]

Examples of the organometallic compounds (B-1) include organometallic compounds containing Group 1, 2, 12 or 13 elements of the periodic table, as described below:

Organoaluminum compounds represented by:

$$R^a{}_mAl(OR^b)_nH_pX_q$$

wherein $R^a$ and $R^b$ may be the same or different and are each a hydrocarbon group of 1 to 15, and preferably 1 to 4 carbon atoms; X is a halogen atom; $0<m\leq3$, $0\leq n<3$, $0\leq p<3$, $0\leq q<3$ and $m+n+p+q=3$.

The aluminum compounds used in the working examples described later are triisobutylaluminum and triethylaluminum.

[(B-2) Organoaluminum Oxy-Compounds]

The organoaluminum oxy-compounds (B-2) used as required in the present invention may be conventional aluminoxanes or benzene-insoluble organoaluminum oxy-compounds as described in JP-A-H02-78687.

The organoaluminum oxy-compound used in the working examples described later is a toluene solution of MAO (=methylalumoxane) available from Nippon Aluminum Alkyls, Ltd.

[(B-3) Compounds Reacting with Transition Metal Compounds to Form Ion Pair]

Examples of the compounds (B-3) capable of reacting with the bridged metallocene compounds (A) to form an ion pair (hereinafter, also referred to as the "ionizing ionic compounds") include Lewis acids, ionic compounds, borane compounds and carborane compounds as described in JP-A-H01-501950, JP-A-H0'-502036, JP-A-H03-179005, JP-A-H03-179006, JP-A-H03-207703, JP-A-H03-207704, and U.S. Pat. No. 5,321,106. Heteropoly compounds and isopoly compounds may also be employed. The ionizing ionic compounds (B-3) may be used singly, or two or more kinds may be used in combination.

The components (B) are not particularly limited, and the compounds (B-1) and (B-2) are used in combination in the working examples described later.

(C) Fine Particulate Carriers

The fine particulate carrier (C) optionally used in the invention is an inorganic or organic compound in the form of granular or fine particulate solid. Preferred inorganic compounds include porous oxides, inorganic halides, clays, clay minerals and ion-exchange layered compounds. The porous oxides have different properties depending on the types and preparation processes. The carriers used in the invention preferably have a particle diameter of 1 to 300 μm, preferably 3 to 200 μm, a specific surface area of 50 to 1,000 (m$^2$/g), preferably 100 to 800 (m$^2$/g), and a pore volume of 0.3 to 3.0 (cm$^3$/g). If necessary, the carrier may be calcined at 80 to 1,000° C., and preferably 100 to 800° C. prior to use.

The olefin polymerization catalysts may further contain organic compound components (D) described below as required in addition to the bridged metallocene compounds (A), at least one compound (B) selected from the organometallic compounds (B-1), organoaluminum oxy-compounds (B-2) and ionizing ionic compounds (B-3), and optionally the fine particulate carriers (C).

(D) Organic Compound Components

In the present invention, the organic compound components (D) may be optionally used to improve polymerization performance and properties of the obtainable polymers.

Examples of the organic compounds include alcohols, phenolic compounds, carboxylic acids, phosphorus compounds and sulfonates.

The ethylene polymers of the present invention may be prepared by homopolymerizing ethylene, copolymerizing ethylene and the C6-10 α-olefin, or carrying out the homopolymerization and the copolymerization continuously in an arbitrary order using the olefin polymerization catalyst as described above.

In the polymerization, the components may be used or added in any manner or order without limitation. Exemplary polymerization methods are the following (P1) to (P10).

(P1) The component (A) and at least one component (B) selected from the organometallic compounds (B-1), the organoaluminum oxy-compounds (B-2) and the ionizing ionic compounds (B-3) (hereinafter, also referred to as the component (B)) are added to a polymerization reactor in any order.

(P2) A catalyst obtained by bringing the component (A) and the component (B) into contact with each other is added to a polymerization reactor.

(P3) The component (A) and the component (B) are brought into contact with each other. The resultant catalyst component and the component (B) are added to a polymerization reactor in any order. In this case, the components (B) may be the same or different.

(P4) A catalyst component in which the component (A) is supported on the fine particulate carrier (C), and the component (B) are added to a polymerization reactor in any order.

(P5) A catalyst in which the components (A) and (B) are supported on the fine particulate carrier (C) is added to a polymerization reactor.

(P6) A catalyst component in which the components (A) and (B) are supported on the fine particulate carrier (C), and the component (B) are added to a polymerization reactor in any order. In this case, the components (B) may be the same or different.

(P7) A catalyst component in which the component (B) is supported on the fine particulate carrier (C), and the component (A) are added to a polymerization reactor in any order.

(P8) A catalyst component in which the component (B) is supported on the fine particulate carrier (C), and the component (A) and the component (B) are added to a polymerization reactor in any order. In this case, the components (B) may be the same or different.

(P9) A catalyst component in which the components (A) and (B) are supported on the fine particulate carrier (C) is brought into contact with the component (B), and the resultant catalyst is added to a polymerization reactor. In this case, the components (B) may be the same or different.

(P10) A catalyst component in which the components (A) and (B) are supported on the fine particulate carrier (C) is brought into contact with the component (B). The resultant catalyst component and the component (B) are added to a polymerization reactor in any order. In this case, the components (B) may be the same or different.

In the methods (P1) to (P10), two or more of the catalyst components may be brought into contact with each other beforehand.

In the methods in which the components (A) and (B) are supported on the fine particulate carrier (C), namely in the methods (P5), (P6), (P9) and (P10), such catalyst component may be prepolymerized with an olefin. The prepolymerized solid catalyst component is generally prepolymerized with 0.1 to 1000 g, preferably 0.3 to 500 g, and particularly preferably 1 to 200 g of an olefin per 1 g of the solid catalyst component. Examples of the olefins to be prepolymerized include ethylene and the foregoing C6-10 α-olefins, and ethylene may be preferably used. In the present invention, the ethylene polymers are generally produced by the methods involving the fine particulate carrier (C). In preferred polymerization methods, a catalyst component in which the components (A) and (B) are supported on the fine particulate carrier (C) is prepolymerized with ethylene; and this catalyst component and the component (B) are added to a polymerization reactor in any order.

To allow the polymerization to proceed smoothly, antistatic agents or antifouling agents may be used or supported on carriers.

The polymerization may be carried out by a liquid-phase polymerization process such as solution polymerization or suspension polymerization, or by a gas-phase polymerization process. From the viewpoint of productivity, suspension polymerization or gas-phase polymerization may be preferably adopted.

The liquid-phase polymerization process may involve inert hydrocarbon solvents. Examples of the inert hydrocarbon solvents include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures of these solvents. The olefins may be used as solvents. In the working examples described later, hexane is used as the inert hydrocarbon solvent in suspension polymerization; however, the scope of the present invention is not limited thereto.

In the (co)polymerization with the olefin polymerization catalyst, the component (A) is generally used such that the amount thereof per liter of the reaction volume is in the range of $10^{-12}$ to $10^{-2}$ mol, and preferably $10^{-10}$ to $10^{-3}$ mol.

When the component (B-1) is used, the amount thereof is such that the molar ratio [(B-1)/M] of the component (B-1) to the transition metal atoms (M) in the component (A) is generally in the range of 0.01 to 100,000, and preferably 0.05 to 50,000.

When the component (B-2) is used, the amount thereof is such that the molar ratio [(B-2)/M] of the aluminum atoms in the component (B-2) to the transition metal atoms (M) in the component (A) is generally in the range of 10 to 500,000, and preferably 20 to 100,000.

When the component (B-3) is used, the amount thereof is such that the molar ratio [(B-3)/M] of the component (B-3) to the transition metal atoms (M) in the component (A) is generally in the range of 1 to 100, and preferably 2 to 80.

The component (D) may be optionally used in amounts such that: when the component (B) is the component (B-1), the molar ratio [(D)/(B-1)] is generally in the range of 0.01 to 10, and preferably 0.1 to 5; when the component (B) is the component (B-2), the molar ratio [(D)/(B-2)] is generally in the range of 0.001 to 2, and preferably 0.005 to 1; and when the component (B) is the component (B-3), the molar ratio [(D)/(B-3)] is generally in the range of 0.01 to 10, and preferably 0.1 to 5.

The polymerization temperature is usually in the range of −50 to +250° C., preferably 0 to 200° C., and particularly preferably 60 to 170° C. The polymerization pressure is generally from atmospheric pressure to 100 (kg/cm$^2$), and preferably atmospheric pressure to 50 (kg/cm$^2$). The polymerization reaction may be carried out batchwise, semi-continuously or continuously. Generally, the polymerization may be carried out in a gas phase or a slurry phase in which polymer particles are precipitated in the solvent. In the case of the slurry polymerization or gas-phase polymerization, the polymerization temperature is preferably from 60 to 90° C., and more preferably from 65 to 85° C. The polymerization at this range of temperatures affords ethylene polymers having a narrower composition distribution.

The ethylene polymers that are main components constituting 99 wt % or more of the blow molding ethylene resin compositions may show a monomodal or multimodal elution curve according to gel permeation chromatography (GPC), as long as the blow molding ethylene resin compositions satisfy the foregoing requirements. However, multimodal ethylene polymers are preferable, and bimodal ethylene polymers are more preferable from the viewpoint that the requirements [a] to [g] may be easily tuned in the claimed ranges.

The bimodal ethylene polymers may be prepared by separately producing two or more kinds of polymers in respective polymerization reactors and blending the plurality of polymers such that the obtainable blow molding ethylene resin composition will achieve the foregoing requirements. Alternatively, they may be prepared by continuous polymerization using two or more serial polymerization reactors under different reaction conditions. The latter continuous process is preferably used from the viewpoints that it eliminates the blending of polymers and is suited for mass production. In an embodiment, the ethylene polymer may be prepared by a two-stage process in which an ethylene homopolymer having an intrinsic viscosity of 0.6 to 1.8 (dl/g), preferably 0.7 to 1.5 (dl/g) is synthesized in the first-stage polymerization reactor in an amount corresponding to 50 to 75 wt %, preferably 55 to 70 wt % based on the final polymer, and an ethylene copolymer having an intrinsic viscosity of 5.5 to 15 (dl/g), preferably 6.5 to 13 (dl/g) is synthesized in the second-stage polymerization reactor in an amount corresponding to 25 to 50 wt %, preferably 30 to 45 wt % based on the final polymer. The synthesis of the ethylene homopolymer and the ethylene copolymer may be reversed. However, it is preferred that the ethylene homopolymer is produced first from the viewpoint that the requirements for the blow molding ethylene resin composition may be controlled easily.

In a preferred polymerization method using the fine particulate carrier (C), the polymer obtained is in the form of particles having diameters of approximately several tens to several thousands of μ meters. When the polymer is produced by a continuous process with two or more polymerization reactors, it may be necessary that the polymer is dissolved in a good solvent and precipitated in a poor solvent, or the polymer is sufficiently melt-kneaded in a specific kneader.

The molecular weight of the ethylene polymer particles may be controlled by the presence of hydrogen molecules in the polymerization system or by changing the polymerization temperature. Alternatively, the molecular weight may be controlled by selecting the type of the components (B) used.

The polymer particles from the polymerization reaction are generally pelletized in the following manners.

(1) The ethylene polymer particles and optionally other desired components are mechanically blended using an extruder, a kneader or the like and the blend is cut to a predetermined size.

(2) The ethylene polymer particles and optionally other desired components are dissolved in an appropriate good solvent (e.g., hydrocarbon solvents such as hexane, heptane, decane, cyclohexane, benzene, toluene and xylene), the solvent is thereafter removed, and the residue is mechanically blended using an extruder, a kneader or the like and is cut to a predetermined size.

A blow molding ethylene resin composition containing two or more kinds of ethylene resins may be produced by mixing two or more kinds of blow molding ethylene resins according to the method (1) or (2).

The ethylene polymer compositions of the present invention may contain other components as required while still achieving the object of the invention. Exemplary additional components are additives such as weathering stabilizers, heat stabilizers, antistatic agents, anti-slip agents, anti-blocking agents, anti-fogging agents, lubricants, dyes, nucleating agents, plasticizers, anti-aging agents, hydrochloric acid absorbents and antioxidants; and pigments such as carbon black, titanium oxide, titanium yellow, phthalocyanine, isoindolinone, quinacridone compounds, condensed azo compounds, ultramarine blue and cobalt blue.

The blow molded articles according to the present invention comprise the ethylene resin compositions as described above. Fuel tanks are a preferred embodiment of the blow molded articles.

The blow molded articles include a layer formed from the blow molding ethylene resin composition. In detail, the blow molded articles of the invention may be composed of monolayers as monolayer containers or may be composed of two or more layers as multilayer containers. The thickness of the blow molded articles may be freely determined in the range of 100 μm to 5 mm depending on use.

For example, a multilayer container may be formed of two layers wherein the first layer may be formed from the polyethylene resin composition of the invention and the other layer may be formed from a composition containing a different resin that differs from the polyethylene resin composition forming the first layer or may be formed from the polyethylene resin composition of the invention that has properties differing from the polyethylene resin composition forming the first layer.

Examples of the "different resins" include polyamides (e.g., nylon 6, nylon 66, nylon 12, copolymerized nylons), ethylene/vinyl alcohol copolymers, polyesters (e.g., polyethylene terephthalate), and modified polyolefins. Of these, ethylene/vinyl alcohol copolymers and polyamide resins are preferable because they have gas barrier functions that are not achieved by polyethylene alone. To increase interlayer bond strength, it is preferred that a layer of the gas barrier resin such as ethylene/vinyl alcohol copolymer or polyamide resin is laminated and integrated with the polyethylene resin layer through an adhesive resin layer, whereby containers with excellent impact resistance and gas barrier properties may be manufactured. Preferred examples of the adhesive resins are adhesive polyolefin resins such as carboxylic acid-grafted polyolefins and metal ion-bridged ethylene/unsaturated carboxylic acid copolymers.

Fuel tanks are a preferred embodiment of the blow molded articles of the present invention. According to a more preferred embodiment, fuel tanks have a laminate structure that includes, from the inside to the outside, a layer (I) comprising the blow molding ethylene resin composition, an adhesive layer (IV), a barrier layer (II) as described above, and a recycled layer (III).

In another preferred embodiment of the fuel tanks, a polyethylene layer (I) comprising the blow molding ethylene resin composition and a barrier layer (II) are laminated together through an adhesive layer (IV). In a still another preferred embodiment, a recycled layer (III) and a barrier layer (II) are laminated together through an adhesive layer. In detail, a fuel tank according to a still more preferred embodiment of the invention has a laminate structure: blow molded ethylene resin composition layer (I)/adhesive layer (IV)/barrier layer (II)/adhesive layer (IV)/recycled layer (III)/blow molded ethylene resin composition layer (I). The recycled layers are known as regrind layers, and are preferably produced from scraps, so-called burrs, from the materials used in the production of blow molded plastic articles.

The blow molded articles of the invention may be fabricated by known blow molding processes. The blow molding processes are largely categorized into extrusion blow molding, two stage blow molding and injection molding. In the present invention, extrusion blow molding is particularly suitable.

EXAMPLES

The present invention will be described in detail based on examples hereinbelow without limiting the scope of the invention. Properties and measurement samples were evaluated or prepared as follows.

(1) Preparation of Measurement Samples

100 Parts by weight of ethylene polymer particles were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/300×4/60/40) at a temperature of 200° C. and a resin output of 25 kg/h. A measurement sample was thus prepared.

(2) Intrinsic Viscosity ([η])

The intrinsic viscosity was measured at 135° C. in a decalin solution. In detail, approximately 20 mg of the granulated pellets were dissolved in 15 ml of decalin, and the specific viscosity $\eta_{sp}$ was measured in an oil bath at 135° C.; after the decalin solution was diluted with 5 ml of decalin, the specific viscosity $\eta_{sp}$ was likewise measured. The dilution was repeated another two times. The concentration (C) was extrapolated to zero concentration (O), and the value $\eta_{sp}/C$ was obtained as the intrinsic viscosity. (See the equation below.)

$$[\eta]=\lim(\eta_{sp}/C) \ (C \rightarrow 0)$$

(3) Density (d)

The pellets were formed into 0.5 mm thick sheets with a hydraulic hot press (manufactured by SHINTO Metal Industries Corporation) set at 190° C. under a pressure of 100 kg/cm². (The spacer consisted of a 240×240×0.5 mm plate with spaces for making nine (9) test specimens each 45×45×0.5 mm in size.) The sheets were then cooled while being compressed in another hydraulic hot press (manufactured by SHINTO Metal Industries Corporation) set at 20° C. under a pressure of 100 kg/cm², thereby preparing measurement specimens. The hot plate was an SUS plate 5 mm in thickness. The pressed sheets were heat treated at 120° C. for 1 hour and were gradually cooled to room temperature in 1 hour with linear temperature lowering. The density was then determined by use of a density gradient tube.

(4) Melt Flow Rate (MFR)

MFR was determined in accordance with ASTM D 1238-89 at 190° C. and under a load of 2.16 kg, 5 kg or 21.6 kg.

(5) Number of Methyl Branches The number of methyl branches per 1000 carbon atoms in polyethylene molecular chain was determined by $^{13}C$-NMR. EPC 500 nuclear magnetic resonance apparatus ($^1H$: 500 MHz) manufactured by JEOL Ltd. was used. The number of scans was 10,000 to 30,000. The chemical shift used was a peak of main chain methylene (29.97 ppm). In a commercially available NMR quartz glass tube having a diameter of 10 mm, 250-400 mg of the sample and 3 ml of a liquid mixture consisting of special grade o-dichlorobenzene (Wako Pure Chemical Industries, Ltd.):benzene-d6 (ISOTEC) (=5:1 by volume) were added. The mixture was heated at 120° C. to give a uniform dispersion, which was analyzed. The absorptions in the NMR spectrum were assigned in accordance with Kagaku no Ryouiki Zoukan (Region of chemistry, extra edition) No. 141, NMR—Sousetsu to Jikken Gaido (Review and Experimental Guide) [I], pp. 132-133. The number of methyl branches per 1000 carbon atoms was calculated from the integrated intensity ratio of the absorption intensity (19.9 ppm) assigned to the methyl groups of the methyl branches relative to the integrated total of the absorption intensities at 5-45 ppm. The detection limit was 0.08, and any fewer methyl branches per 1000 carbon atoms were not detected.

(6) Flexural Modulus Test for Pressed Sheet

The flexural modulus was evaluated by the procedure for determining flexural properties as described in JIS K 7171, in accordance with JIS K 6922-2 (Table 3) "General properties and testing conditions". In detail, a pressed sheet 4 mm in thickness was formed at a molding temperature of 180° C., cooled at an average cooling rate of 15° C./min, and taken out at 40° C. A test piece 80 mm in length, 10 mm in width and 4 mm in thickness was punched out from the sheet. The test piece was tested at 23° C., a distance between the supports of 64 mm, and a testing rate of 2.0 mm/min.

(7) Tensile Impact Test at −40° C.

The tensile impact strength was tested in accordance with JIS K 7160 "Plastics—Determination of tensile impact strength". In detail, a pressed sheet 4 mm in thickness was formed at a molding temperature of 180° C., cooled at an average cooling rate of 15° C./min, and taken out at 40° C. A type-4 test piece described in JIS K 7160 was punched out from the sheet. The test piece was tested at a testing temperature of −40° C., a hammer energy of 7.5 J and a swing angle of 148.8° to determine the tensile impact strength.

(8) Tensile Creep Strain at 80° C.

The tensile creep was tested in accordance with JIS K 7115 "Plastics—Determination of creep behavior—Part 1: Tensile creep". In detail, a pressed sheet 4 mm in thickness was formed at a molding temperature of 180° C., cooled at an average cooling rate of 15° C./min, and taken out at 40° C. A type-1B test piece described in JIS K 7162 was punched out from the sheet. An initial load of 6 MPa was applied to the test piece at 80° C., and the amount of strain after 100 hours was measured.

(9) Tensile Fatigue Strength at 80° C.

The pellets were formed into 6 mm thick sheets with a hydraulic hot press (manufactured by SHINTO Metal Industries Corporation) set at 190° C. under a pressure of 100 (kg/cm²). (The spacer consisted of a 200×200×6 mm plate with spaces for making four (4) test specimens each 30×60×6 mm in size.) The sheets were then cooled while being compressed in another hydraulic hot press (manufactured by SHINTO Metal Industries Corporation) set at 20° C. under a pressure of 100 (kg/cm²), thereby preparing measurement specimens for testing tensile fatigue strength at 80° C. The 30×60×6 mm pressed sheets were machined to 5-6 mm×6 mm×60 mm rectangular columns as actual test pieces.

The tensile fatigue strength (test piece shape) was tested in accordance with JIS K 6774 (circumferential notch, notch depth: 1 mm) using ServoPulser EHF-ER1KNx4-40L manufactured by Shimadzu Corporation. The evaluation conditions were summarized below.

Test piece shape: notched 5-6 mm×6 mm×60 mm rectangular column

Test waveform and frequency: square wave, 0.5 Hz

Testing temperature: 80° C.

Under the above conditions, measurements were carried out at actual stress values in the range of 10 to 18 MPa, and the number of cycles to fracture was determined. In detail, measurements were carried out with respect to at least six (6) points differing in actual stress from one another, with an at least three digit number of cycles to fracture or with at least 3 MPa actual stress. An approximation formula was prepared by logarithmic least squares approximation, and the actual stress corresponding to a number of cycles to fracture of 10,000 or 100,000 was obtained.

Synthetic Example 1

Preparation of Solid Catalyst Component (α)

8.5 Kg of silica dried at 200° C. for 3 hours was suspended in 33 L of toluene. 82.7 L of a methylaluminoxane solution (Al=1.42 mol/L) was added dropwise to the suspension over a period of 30 minutes. The mixture was heated to 115° C. in 1.5 hours, and was reacted at the temperature for 4 hours. Thereafter, the temperature was lowered to 60° C., and the supernatant liquid was removed by decantation. The resultant solid catalyst component was washed with toluene three times, and was resuspended in toluene to give a solid catalyst component (α) (total volume: 150 L).

Synthetic Example 2

Preparation of Solid Catalyst Component (γ) Supporting Metallocene Compound

A thoroughly nitrogen purged reactor was charged with 19.60 mol in terms of aluminum atom of the toluene suspension of the solid catalyst component (a) from Synthetic Example 1. While stirring the suspension, 2 L (61.12 mmol) of a 31.06 (mmol/L) solution of di(p-tolyl)methylene(cyclopentadienyl) (octamethyloctahydrodibenzofluorenyl)zirconium dichloride was added at room temperature (20-25° C.), followed by stirring for 60 minutes. After the stirring, the supernatant liquid was removed by decantation. The residue was washed with 40 L of n-hexane two times, and a supported catalyst resulted. The catalyst was resuspended in n-hexane to afford 25 L of a solid catalyst component (γ) as a catalyst suspension.

Preparation of Solid Catalyst Component (δ) by Prepolymerization on Solid Catalyst Component (γ)

In a nitrogen atmosphere, a reactor equipped with a stirrer was charged with 15.8 L of purified n-hexane and the solid catalyst component (γ) and was further charged with 5 mol of triisobutylaluminum. While stirring the reaction system, prepolymerization was carried out by feeding ethylene in an amount such that 3 g of polyethylene would be formed in 4 hours per 1 g of the solid catalyst component (γ). The polymerization temperature was kept in the range of 20 to 25° C. After the polymerization, stirring was discontinued and the supernatant liquid was removed by decantation. The residue was washed with 35 L of n-hexane four times, and a supported catalyst resulted. The catalyst was resuspended in 20 L of n-hexane to give a solid catalyst component (δ).

Example 1

Polymerization

A first polymerization vessel was continuously charged with 45 (L/h) of hexane, 0.07 (mmol/h) in terms of zirconium atom of the solid catalyst component (6) from Synthetic Example 2, 20 (mmol/h) of triethylaluminum, 7.0 (kg/h) of ethylene and 40

(N-L/h) of hydrogen molecules. Further, there was continuously fed 0.5 g/h of (polyethylene glycol)(polypropylene glycol) block copolymer (EPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 3.0 (kg/h) of ethylene, 5.5 (N-L/h) of hydrogen molecules and 110 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 969 (kg/m$^3$), MFR under 2.16 kg load of 11 (g/10 min) and [η] of 1.29 (dl/g). Operating conditions were controlled such that the polymer from the first polymerization vessel and the polymer from the second polymerization vessel would account for 65 wt % and 35 wt % of the final polymer, respectively. As a result, a polymer having a density of 955 (kg/m$^3$), MFR under 21.6 kg load of 4.8 (g/10 min) and [η] of 3.72 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/300×4/60/40) at a temperature of 200° C. and a resin output of 25 (kg/h). A measurement sample was thus prepared. The measurement sample was formed into a pressed sheet, and properties thereof were measured. The results are set forth in Table 1. According to $^{13}$C-NMR, the number of methyl branches per 1000 carbon atoms was less than 0.08. The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 2

Polymerization

A first polymerization vessel was continuously charged with 45 (L/h) of hexane, 0.2 (mmol/h) in terms of zirconium atom of the solid catalyst component (δ) from Synthetic Example 2, 20 (mmol/h) of triethylaluminum, 11.0 (kg/h) of ethylene and 75 (N-L/h) of hydrogen molecules. Further, there was continuously fed 0.8 g/h of (polyethylene glycol) (polypropylene glycol) block copolymer (ADEKA PLURONIC L-71 manufactured by ADEKA CORPORATION) having a viscosity of 370 (mPa·s) as measured with a B-type viscometer at 25° C. Polymerization was carried out at a polymerization temperature of 85° C., a reaction pressure of 7.5 (kg/cm$^2$G) and an average residence time of 2.4 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 5.5 (kg/h) of ethylene, 4.0 (N-L/h) of hydrogen molecules and 98 (g/h) of 1-hexene, and polymerization was continuously carried out at a polymerization temperature of 75° C., a reaction pressure of 2.9 (kg/cm$^2$G) and an average residence time of 1.3 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 972 (kg/m$^3$) and [η] of 1.09 (dl/g). Operating conditions were controlled such that the polymer from the first polymerization vessel and the polymer from the second polymerization vessel would account for 54 wt % and 46 wt % of the final polymer, respectively. As a result, a polymer A having a density of 957 (kg/m$^3$) and [η] of 3.08 (dl/g) was obtained.

Separately, operating conditions were controlled such that the polymer from the first polymerization vessel and the polymer from the second polymerization vessel would account for 65 wt % and 35 wt % of the final polymer, respectively. As a result, a polymer B having a density of 956 (kg/m$^3$) and [η] of 4.50 (dl/g) was obtained.

63 Parts by weight of particles of the polymer A and 37 parts by weight of particles of the polymer B were blended with, based on 100 parts by weight of the total of the polymers, 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/300×4/60/40) at a temperature of 200° C. and a resin output of 25 (kg/h). A measurement sample was thus prepared. The measurement sample was formed into a pressed sheet, and properties thereof were measured. The results are set forth in Table 1. According to $^{13}$C-NMR, the number of methyl branches per 1000 carbon atoms was less than 0.08. Similar to Example 1, the polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 3

Polymerization

A first polymerization vessel was continuously charged with 45 (L/h) of hexane, 0.11 (mmol/h) in terms of zirconium atom of the solid catalyst component (δ) from Synthetic Example 2, 20 (mmol/h) of triethylaluminum, 9.1 (kg/h) of ethylene and 62.5 (N-L/h) of hydrogen molecules. Further, there was continuously fed 0.5 g/h of (polyethylene glycol) (polypropylene glycol) block copolymer (EPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 7.4 (kg/h) of ethylene, 4.4 (N-L/h) of hydrogen molecules and 22 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 970 (kg/m$^3$), MFR under 2.16 kg load of 28 (g/10 min) and [η] of 1.01 (dl/g). Operating conditions were controlled such that the polymer from the first polymerization vessel and the polymer from the second polymerization vessel would account for 55 wt % and 45 wt % of the final polymer, respectively. As a result, a polymer having a density of 957 (kg/m$^3$), MFR under 21.6 kg load of 2.1 (g/10 min) and [η] of 4.44 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/80×2/60/40) at a temperature of 200° C. and a resin output of 25 (kg/h). A measurement sample was thus prepared. The measurement sample was formed into a pressed sheet, and properties thereof were measured. The results are set forth in Table 1. According to $^{3}$C-NMR, the number of methyl branches per 1000 carbon atoms was less than 0.08. The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 4

Polymerization

A first polymerization vessel was continuously charged with 45 (L/h) of hexane, 0.07 (mmol/h) in terms of zirconium atom of the solid catalyst component (δ) from Synthetic Example 2, 20 (mmol/h) of triethylaluminum, 13.0 (kg/h) of ethylene and 56 (N-L/h) of hydrogen molecules. Further, there was continuously fed 0.5 g/h of (polyethylene glycol) (polypropylene glycol) block copolymer (EPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 7.0 (kg/h) of ethylene, 3.0 (N-L/h) of hydrogen molecules and 42 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 969 kg/m$^3$, MFR under 2.16 kg load of 16 g/10 min and [η] of 1.14 dl/g. Operating conditions were controlled such that the polymer from the first polymerization vessel and the polymer from the second polymerization vessel would account for 65 wt % and 35 wt % of the final polymer, respectively. As a result, a polymer having a density of 958 (kg/m$^3$), MFR under 21.6 kg load of 5.1 (g/10 min) and [η] of 3.86 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/80×2/60/40) at a temperature of 200° C. and a resin output of 25 (kg/h). A measurement sample was thus prepared. The measurement sample was formed into a pressed sheet, and properties thereof were measured. The results are set forth in Table 1. According to $^{13}$C-NMR, the number of methyl branches per 1000 carbon atoms was less than 0.08.

The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 5

Polymerization

A first polymerization vessel was continuously charged with 45 (L/h) of hexane, 0.05 (mmol/h) in terms of zirconium atom of the solid catalyst component (δ) from Synthetic Example 2, 20 (mmol/h) of triethylaluminum, 9.1 (kg/h) of ethylene and 51 (N-L/h) of hydrogen molecules. Further, there was continuously fed 0.5 g/h of (polyethylene glycol) (polypropylene glycol) block copolymer (EPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 4.9 (kg/h) of ethylene, 3.5 (N-L/h) of hydrogen molecules and 26 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 968 kg/m$^3$, MFR under 2.16 kg load of 14 g/10 min and [η] of 1.16 dl/g. Operating conditions were controlled such that the polymer from the first polymerization vessel and the polymer from the second polymerization vessel would account for 65 wt % and 35 wt % of the final polymer, respectively. As a result, a polymer having a density of 958 (kg/m$^3$), MFR under 21.6 kg load of 4.8 (g/10 min) and [η] of 3.63 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/80×2/60/40) at a temperature of 200° C. and a resin output of 25 (kg/h). A measurement sample was thus prepared. The measurement sample was formed into a pressed sheet, and properties thereof were measured. The results are set forth in Table 1. According to $^{13}$C-NMR, the number of methyl branches per 1000 carbon atoms was less than 0.08. The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 6

Polymerization

A first polymerization vessel was continuously charged with 45 (L/h) of hexane, 0.04 (mmol/h) in terms of zirconium atom of the solid catalyst component (δ) from Synthetic Example 2, 20 (mmol/h) of triethylaluminum, 13.0 (kg/h) of ethylene and 55 (N-L/h) of hydrogen molecules. Further, there was continuously fed 0.5 g/h of (polyethylene glycol) (polypropylene glycol) block copolymer (EPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 7.0 (kg/h) of ethylene, 2.5 (N-L/h) of hydrogen molecules and 42 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 969 kg/m$^3$, MFR under 2.16 kg load of 11 g/10 min and [η] of 1.22 dl/g. Operating conditions were controlled such that the polymer from the first polymerization vessel and the polymer from the second polymerization vessel would account for 65 wt % and 35 wt % of the final polymer, respectively. As a result, a polymer having a density of 956 (kg/m$^3$), MFR under 21.6 kg load of 5.3 (g/10 min) and [η] of 3.67 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/80×2/60/40) at a temperature of 200° C. and a resin output of 25 (kg/h). A measurement sample was thus prepared. The measurement sample was formed into a pressed sheet, and properties thereof were measured. The results are set forth in Table 2. According to $^{13}$C-NMR, the number of methyl branches per 1000 carbon atoms was less than 0.08. The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Example 7

Polymerization

A first polymerization vessel was continuously charged with 45 (L/h) of hexane, 0.07 (mmol/h) in terms of zirconium atom of the solid catalyst component (δ) from Synthetic Example 2, 20 (mmol/h) of triethylaluminum, 13.0 (kg/h) of ethylene and 59 (N-L/h) of hydrogen molecules. Further, there was continuously fed 0.5 g/h of (polyethylene glycol) (polypropylene glycol) block copolymer (SPAN 720 manufactured by DAI-ICHI KOGYO SEIYAKU CO., LTD.) having a viscosity of 500 (mPa·s) as measured with a B-type viscometer at 25° C. Polymerization was carried out at a polymerization temperature of 80° C., a reaction pressure of 7.6 (kg/cm$^2$G) and an average residence time of 2.6 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm$^2$G) and a temperature of 60° C. where unreacted ethylene and hydrogen molecules were substantially removed.

The content was then continuously fed to a second polymerization vessel together with 43 (L/h) of hexane, 8.7 (kg/h) of ethylene, 2.9 (N-L/h) of hydrogen molecules and 44 (g/h) of 1-hexene, and polymerization was continuously carried out at a polymerization temperature of 75° C., a reaction pressure of 3.3 (kg/cm$^2$G) and an average residence time of 1.4 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 971 (kg/m$^3$), MFR under 2.16 kg load of 14 (g/10 min) and [η] of 1.16 (dl/g). Operating conditions were controlled such that the polymer from the first polymerization vessel and the polymer from the second polymerization vessel would account for 61 wt % and 39 wt % of the final polymer, respectively. As a result, a polymer having a density of 958 (kg/m³), MFR under 21.6 kg load of 5.5 (g/10 min) and [η] of 3.27 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/80×2/60/40) at a temperature of 200° C. and a resin output of 25 (kg/h). A measurement sample was thus prepared. The measurement sample was formed into a pressed sheet, and properties thereof were measured. The results are set forth in Table 2. According to $^{13}$C-NMR, the number of methyl branches per 1000 carbon atoms was less than 0.08. The polymer was found to be very excellent in balance between rigidity and impact strength and balance between rigidity and fatigue strength compared to Comparative Examples. Further, the polymer showed very small tensile creep strain and achieved excellent heat distortion (creep) resistance compared to Comparative Examples.

Comparative Example 1

Polymerization

A first polymerization vessel was continuously charged with 45 (L/h) of hexane, 0.2 (mmol/h) in terms of zirconium atom of the solid catalyst component (δ) from Synthetic Example 2, 20 (mmol/h) of triethylaluminum, 11.0 (kg/h) of ethylene and 80 (N-L/h) of hydrogen molecules. Further, there was continuously fed 0.8 g/h of (polyethylene glycol) (polypropylene glycol) block copolymer (ADEKA PLURONIC L-71 manufactured by ADEKA CORPORATION) having a viscosity of 370 (mPa·s) as measured with a B-type viscometer at 25° C. Polymerization was carried out at a polymerization temperature of 85° C., a reaction pressure of 7.6 (kg/cm²G) and an average residence time of 2.4 hours while the content in the polymerization vessel was continuously discharged to keep the liquid level in the polymerization vessel constant.

The content continuously discharged from the first polymerization vessel was fed to a flash drum maintained at an internal pressure of 0.30 (kg/cm²G) and a temperature of 60° C. where unreacted ethylene and hydrogen molecules were substantially removed.

The content was then continuously fed to a second polymerization vessel together with 43 (L/h) of hexane, 5.5 (kg/h) of ethylene, 3.4 (N-L/h) of hydrogen molecules and 66 (g/h) of 1-hexene, and polymerization was continuously carried out at a polymerization temperature of 75° C., a reaction pressure of 3.0 (kg/cm²G) and an average residence time of 1.3 hours.

The content in the second polymerization vessel was continuously discharged to keep the liquid level in the polymerization vessel constant. To prevent unintended polymerization such as formation of polymers containing large amounts of 1-hexene, 2 (L/h) of methanol was added to the content discharged from the second polymerization vessel in order to deactivate the polymerization catalyst. Thereafter, hexane and unreacted monomers in the content were removed with a solvent separation apparatus, and the residue was dried to give a polymer. The polymer obtained in the first polymerization vessel had a density of 972 (kg/m³) and [η] of 0.95 (dl/g). Operating conditions were controlled such that the polymer from the first polymerization vessel and the polymer from the second polymerization vessel would account for 70 wt % and 30 wt % of the final polymer, respectively. As a result, a polymer having a density of 955 (kg/m³) and [η] of 3.17 (dl/g) was obtained.

100 Parts by weight of particles of the polymer were blended with 0.10 part by weight of tri(2,4-di-tert-butylphenyl)phosphate as a secondary antioxidant and 0.10 part by weight of pentaerythritol tetrakis[3-(3,5-di-tert-butyl-4-hydroxyphenyl)propionate] as a heat stabilizer. The blend was granulated using a single-screw extruder manufactured by Placo Co., Ltd. (screw diameter: 65 mm, L/D=28, screen meshes: 40/60/300×4/60/40) at a temperature of 200° C. and a resin output of 25 (kg/h). A measurement sample was thus prepared. The measurement sample was formed into a pressed sheet, and properties thereof were measured. The results are set forth in Table 2. The measurement sample was formed into a pressed sheet, and properties thereof were measured. The results are set forth in Table 1. Due to MFR values higher than those in Examples, the impact strength and fatigue strength were lower and the tensile creep strain was larger than in Examples.

Comparative Example 2

Ziegler-catalyzed high-density polyethylene (HI-ZEX 7500M manufactured by Prime Polymer Co., Ltd.) pellets (density=957 (kg/m³), [η]=3.90 (dl/g), number of methyl branches per 1000 carbon atoms according to $^{13}$C-NMR=0.3) were used directly as a measurement sample. The comonomer was 1-butene. The measurement sample was formed into a pressed sheet, and properties thereof were measured. The results are set forth in Table 2. The polymer was found to be inferior in balance between rigidity and impact strength and balance between rigidity and fatigue strength compared to the polymers of Examples. Further, the polymer showed large tensile creep strain and poor heat distortion (creep) resistance compared to Examples.

Comparative Example 3

50 Parts by weight of Ziegler-catalyzed high-density polyethylene pellets (HI-ZEX 8200B manufactured by Prime Polymer Co., Ltd.) and 50 parts by weight of Ziegler-catalyzed high-density polyethylene pellets (HI-ZEX 5202B manufactured by Prime Polymer Co., Ltd.) were mixed together. (The mixture had a density of 956 (kg/m³) and [η] of 3.25 (dl/g), and the number of methyl branches per 1000 carbon atoms according to $^{13}$C-NMR was 0.3.) The blend was granulated using a single-screw extruder manufactured by Placo Co., Ltd. (screw diameter: 65 mm, L/D=28, screen meshes: 40/60/300×4/60/40) at a temperature of 200° C. and a resin output of 25 (kg/h). A measurement sample was thus prepared. The measurement sample was formed into a pressed sheet, and properties thereof were measured. The results are set forth in Table 2. The polymer was found to be inferior in balance between rigidity and impact strength and balance between rigidity and fatigue strength compared to the polymers of Examples. Further, the polymer showed large tensile creep strain and poor heat distortion (creep) resistance compared to Examples.

Comparative Example 4

A high-density polyethylene (Lupolen 4261 AG manufactured by Basell Polyolefins) was used directly as a measurement sample. The measurement sample was formed into a pressed sheet, and properties thereof were measured. The results are set forth in Table 2. The polymer was found to have low rigidity, large tensile creep strain and poor heat distortion (creep) resistance compared to the polymers of Examples.

Comparative Example 5

A high-density polyethylene (Novatec HB111R manufactured by Japan Polyethylene Corporation) was used directly as a measurement sample. The measurement sample was formed into a pressed sheet, and properties thereof were measured. The results are set forth in Table 2. The polymer was found to have low rigidity, large tensile creep strain and poor heat distortion (creep) resistance compared to the polymers of Examples.

TABLE 1

|  | Unit | Ex. 1 | Ex. 2 | Ex. 3 | Ex. 4 | Ex. 5 | Ex. 6 | Ex. 7 |
| --- | --- | --- | --- | --- | --- | --- | --- | --- |
| Polymerization catalyst system |  | Metallocene | Metallocene | Metallocene | Metallocene | Metallocene | Metallocene | Metallocene |
| Density | kg/m$^3$ | 955 | 955 | 957 | 958 | 958 | 956 | 958 |
| [η] | dl/g | 3.72 | 3.72 | 4.44 | 3.86 | 3.63 | 3.67 | 3.27 |
| MFR under 2.16 kg load | g/10 min | 0.020 | 0.027 | 0.010 | 0.017 | 0.020 | 0.024 | 0.028 |
| MFR under 5 kg load | g/10 min | 0.15 | 0.18 | 0.07 | 0.13 | 0.15 | 0.17 | 0.19 |
| MFR under 21.6 kg load | g/10 min | 4.8 | 4.9 | 2.1 | 5.1 | 4.8 | 5.3 | 5.5 |
| Flexural modulus | MPa | 1210 | 1210 | 1230 | 1260 | 1230 | 1260 | 1210 |
| Tensile impact at −40° C. (unnotched) | kJ/m$^2$ | 338 | 305 | 481 | 342 | 371 | 348 | 385 |
| FNFT at 80° C. for 10,000 cycles | MPa | 10.95 | 8.33 | 9.88 | 11.71 | 9.56 | 10.33 | 8.87 |
| FNFT at 80° C. for 100,000 cycles | MPa | 7.64 | 6.57 | 6.12 | 7.31 | 6.27 | 7.03 | 5.94 |
| Tensile creep strain (80° C., 6 MPa, 100 h) | % | 8.3 | 8.5 | 7.5 | 8.1 | 8.2 | 8.3 | 8.2 |

TABLE 2

|  | Unit | Comp. Ex. 1 | Comp. Ex. 2 | Comp. Ex. 3 | Comp. Ex. 4 | Comp. Ex. 5 |
| --- | --- | --- | --- | --- | --- | --- |
| Polymerization catalyst system |  | Metallocene | Ziegler | Ziegler | — | — |
| Density | kg/m$^3$ | 955 | 957 | 956 | 949 | 948 |
| [η] | dl/g | 3.17 | 3.90 | 3.25 | 3.53 | 3.48 |
| MFR under 2.16 kg load | g/10 min | 0.005 | 0.025 | 0.12 | 0.05 | 0.04 |
| MFR under 5 kg load | g/10 min | 0.34 | 0.20 | 0.62 | 0.32 | 0.24 |
| MFR under 21.6 kg load | g/10 min | 9.9 | 7.8 | 11 | 5.9 | 5.5 |
| Flexural modulus | MPa | 1210 | 1260 | 1260 | 930 | 930 |
| Tensile impact at −40° C. (unnotched) | kJ/m$^2$ | 222 | 156 | 210 | 270 | 240 |
| FNFT at 80° C. for 10,000 cycles | MPa | 7.56 | 7.76 | 6.23 | 10.13 | 7.75 |
| FNFT at 80° C. for 100,000 cycles | MPa | 4.48 | 4.96 | 4.18 | 5.74 | 5.01 |
| Tensile creep strain (80° C., 6 MPa, 100 h) | % | 9.0 | 23.3 | 20.1 | 27.5 | 27.3 |

Industrial Applicability

The ethylene resin compositions of the present invention give blow molded articles, preferably fuel tanks, which have excellent long-term properties such as high impact resistance and creep resistance even when they are produced in reduced thickness. Extrusion blow molding the resin compositions provides fuel tanks having hitherto-impossible excellent properties.

The invention claimed is:

1. A fuel tank comprising a blow molded article that comprises a layer comprising a blow molding ethylene resin composition;
wherein the blow molding ethylene resin composition comprises a single or two or more ethylene polymers in the range of 99 wt % or more, wherein the ethylene polymer satisfies the following requirements [1] and [2] at the same time, and wherein the ethylene resin composition satisfies the following requirements [a], [b], [c], [d] and [h] at the same time:
[1] the ethylene polymer is prepared by a process comprising synthesizing an ethylene homopolymer in an amount corresponding to 50 to 65 wt % based on the final polymer, and synthesizing an ethylene/α-olefin copolymer in an amount corresponding to 35 to 50 wt % based on the final polymer;
[2] the intrinsic viscosity [η] of the ethylene homopolymer measured at 135° C. in a decalin solution is in the range of 1.01 to 1.5 (dl/g);
[a] the melt flow rate (MFR) at a temperature of 190° C. under a load of 21.6 kg is in the range of 1.0 to 10 g/10 min;
[b] the density is in the range of 955 to 960 kg/m$^3$;
[c] the number of methyl branches per 1000 carbon atoms is less than 0.1 according to $^{13}$C-NMR;
[d] the tensile impact strength measured at −40° C. in accordance with JIS K 7160 is not less than 270 kJ/m$^2$;
[h] the intrinsic viscosity [η] measured at 135° C. in a decalin solution is in the range of 3.0 to 5.0 (dl/g).

2. The fuel tank according to claim 1, wherein the tank is a blow molded article comprising a laminate structure having a polyethylene layer (I) comprising the blow molding ethylene resin composition, a barrier layer (II), a recycled layer (III) and an adhesive layer (IV).

3. The fuel tank according to claim 2, wherein the polyethylene layer (I) and the barrier layer (II) are laminated together through the adhesive layer (IV).

4. The fuel tank according to claim 2, wherein the barrier layer (II) comprises an ethylene/vinyl alcohol copolymer.

5. The fuel tank according to claim 3, wherein the barrier layer (II) comprises an ethylene/vinyl alcohol copolymer.

6. The fuel tank according to claim 1, wherein the blow molding ethylene resin composition further satisfies the following requirement [e]:
[e] the flexural modulus measured in accordance with JIS K 7171 is in the range of 1,100 to 1,700 MPa.

7. The fuel tank according to claim 1, wherein the blow molding ethylene resin composition further satisfies the following requirement [f]:
[f] in a full-notch tensile fatigue test (FNFT, testing temperature: 80° C., testing speed: 0.5 Hz) in accordance with JIS K 6774, the actual stress is in the range of 5 to 12 MPa when the number of cycles to fracture is 10,000 and the actual stress is in the range of 4 to 8 MPa when the number of cycles to fracture is 100,000.

8. The fuel tank according to claim 6, wherein the blow molding ethylene resin composition further satisfies the following requirement [f]:
[f] in a full-notch tensile fatigue test (FNFT, testing temperature: 80° C., testing speed: 0.5 Hz) in accordance with JIS K 6774, the actual stress is in the range of 5 to 12 MPa when the number of cycles to fracture is 10,000 and the actual stress is in the range of 4 to 8 MPa when the number of cycles to fracture is 100,000.

9. The fuel tank according to claim 1, wherein the blow molding ethylene resin composition further satisfies the following requirement [g]:
[g] in a tensile creep test (testing temperature: 80° C.) in accordance with JIS K 7115, the creep strain at a test stress of 6 MPa after 100 hours is not more than 10%.

10. The fuel tank according to claim 6, wherein the blow molding ethylene resin composition further satisfies the following requirement [g]:
[g] in a tensile creep test (testing temperature: 80° C.) in accordance with JIS K 7115, the creep strain at a test stress of 6 MPa after 100 hours is not more than 10%.

11. The fuel tank according to claim 7, wherein the blow molding ethylene resin composition further satisfies the following requirement [g]:
[g] in a tensile creep test (testing temperature: 80° C.) in accordance with JIS K 7115, the creep strain at a test stress of 6 MPa after 100 hours is not more than 10%.

12. The fuel tank according to claim 8, wherein the blow molding ethylene resin composition further satisfies the following requirement [g]:
[g] in a tensile creep test (testing temperature: 80° C.) in accordance with JIS K 7115, the creep strain at a test stress of 6 MPa after 100 hours is not more than 10%.

* * * * *